United States Patent [19]

Trujillo, Sr.

[11] Patent Number: 4,751,768
[45] Date of Patent: Jun. 21, 1988

[54] HIDE STRIPPING DEVICE AND METHOD FOR USING SAME

[76] Inventor: Nick Trujillo, Sr., R.R. 1, Box 285, Tomah, Wis. 54660

[21] Appl. No.: 70,556

[22] Filed: Jul. 7, 1987

[51] Int. Cl.[4] .............................................. A22B 5/16
[52] U.S. Cl. ........................................... 17/50; 17/21
[58] Field of Search ..................................... 17/21, 50

[56] References Cited

U.S. PATENT DOCUMENTS

| | | | |
|---|---|---|---|
| 3,229,328 | 1/1966 | Schmidt, Jr. | 17/50 X |
| 3,737,949 | 6/1973 | Davis | 17/21 |
| 4,229,860 | 10/1980 | Irwin | 17/50 |

*Primary Examiner*—Willie G. Abercrombie
*Attorney, Agent, or Firm*—Zarley McKee, Thomte, Voorhees & Sease

[57] ABSTRACT

The present invention is a hide stripping device for stripping the hide from a carcass. The device comprises a vertical support frame and a sliding frame mounted to the support frame for vertical sliding movement thereon. On the sliding frame is an operator support stand and a rotatable drum. A chain is attached to the rotatable drum and is adapted to be attached to the hide of the carcass. A hydraulic ram drives the sliding frame downwardly, and at the same time the rotatable drum rotates to wind the chain and the hide upon the drum. Controls for operating the drum and the hydraulic ram are on the operator support stand.

5 Claims, 3 Drawing Sheets

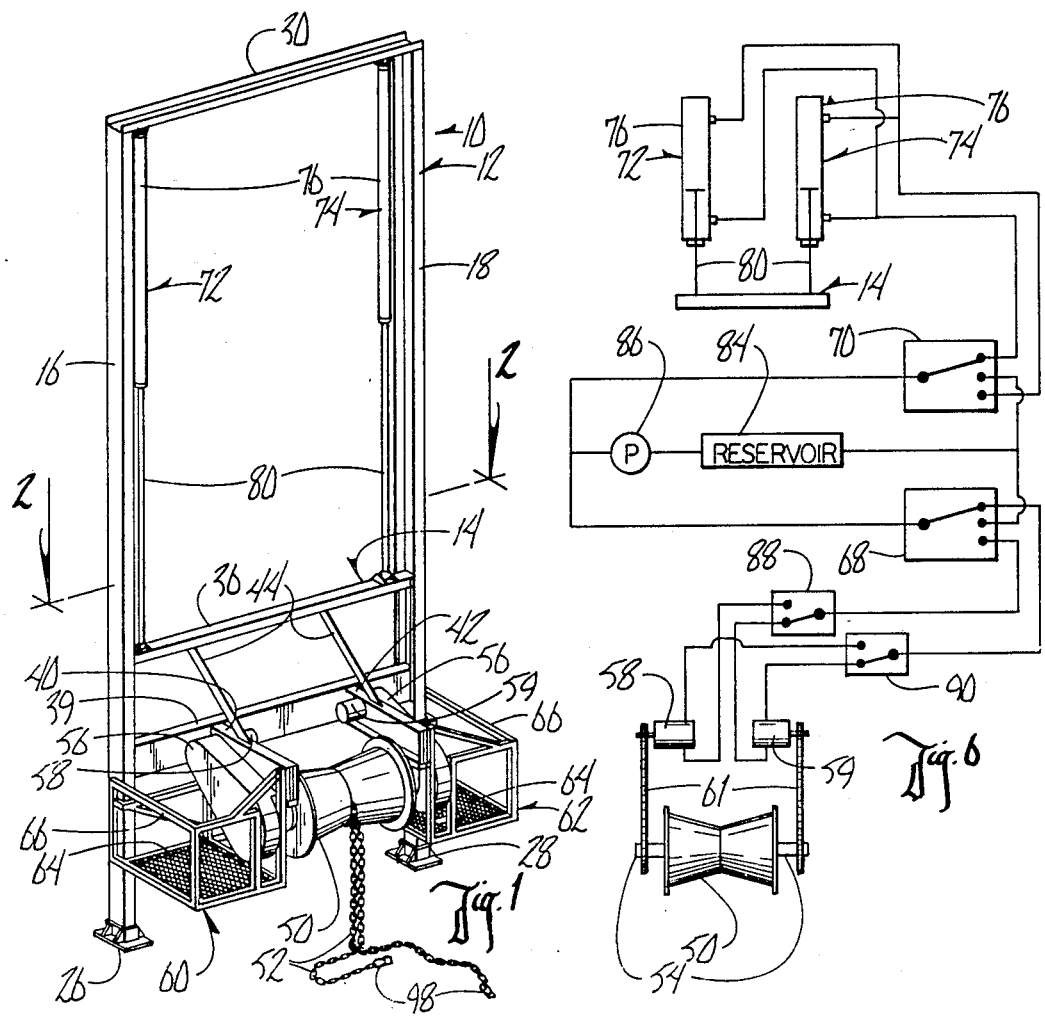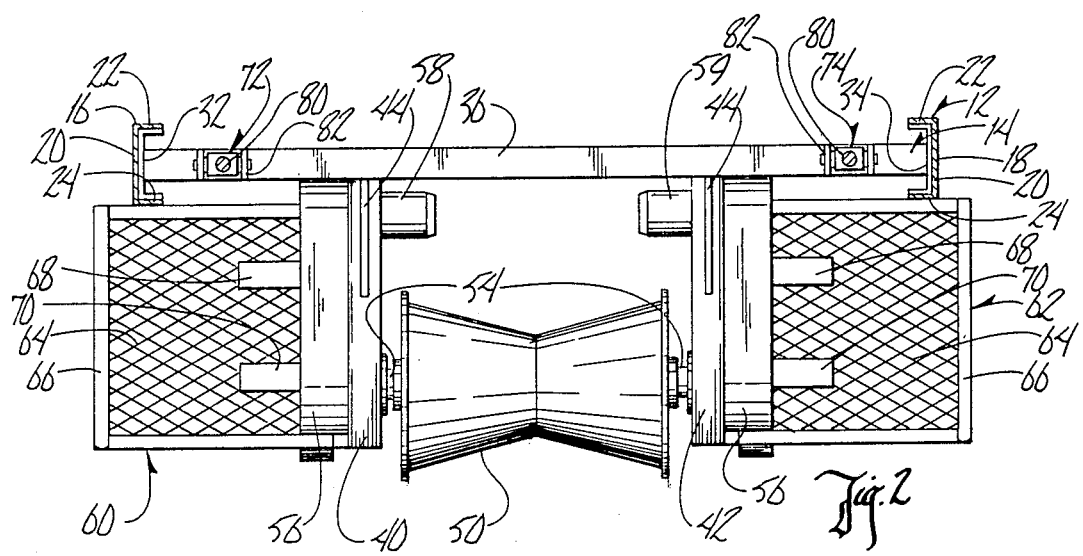

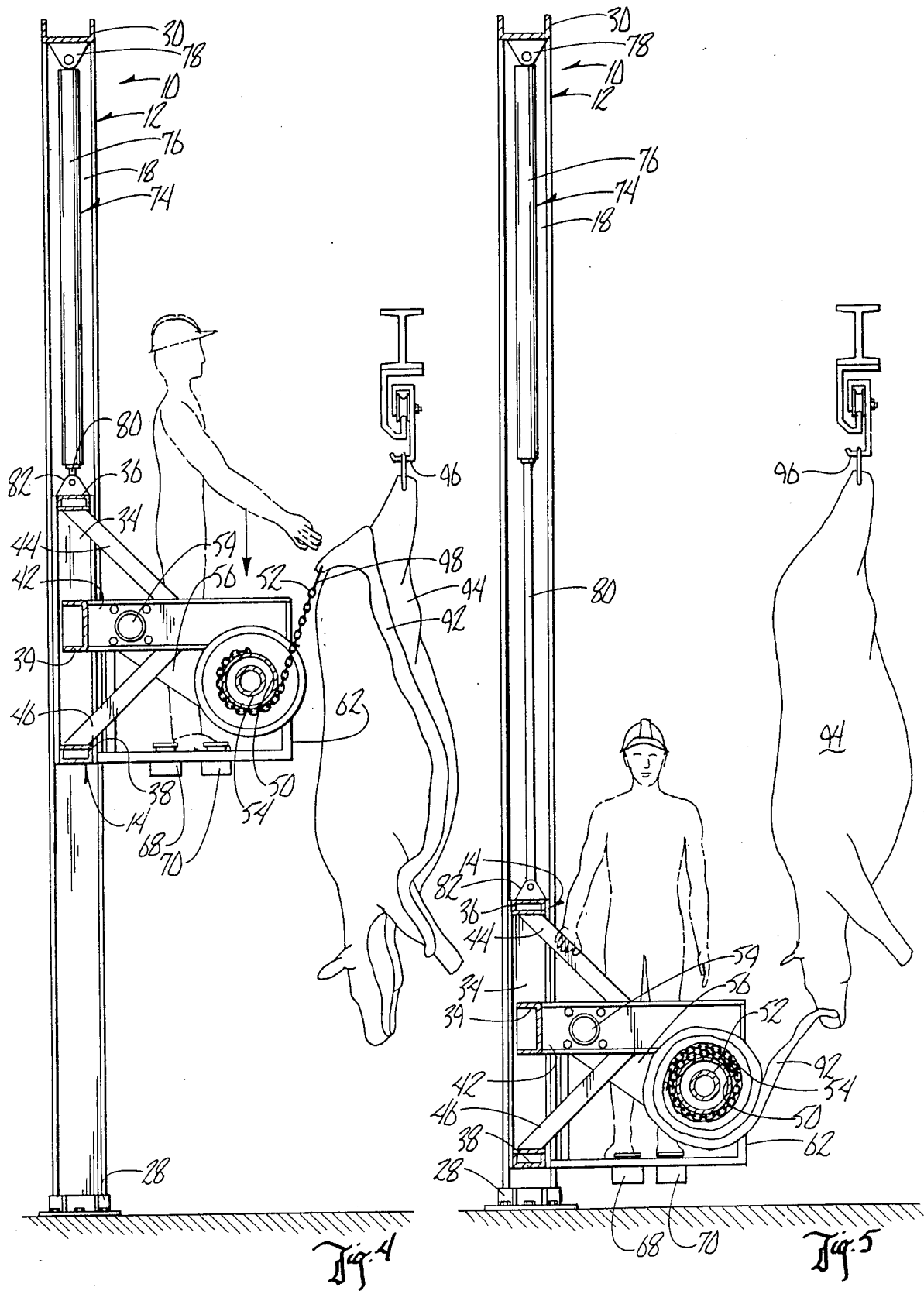

HIDE STRIPPING DEVICE AND METHOD FOR USING SAME

BACKGROUND OF THE INVENTION

This invention relates to a hide stripping device and method for using the same.

Various types of devices have been used for stripping the hide from a carcass in meat processing plants. During the hide stripping operation, the carcass is suspended in an inverted position. The hide is orasped adjacent the tail of the animal and is drawn downwardly and peeled away from the animal. A considerable amount of force is required to do this, and various types of devices have been utilized in an attempt to provide a satisfactory means for removing the hide.

Therefore, a primary object of the present invention is the provision of an improved hide stripping device and method for using same.

A further object of the present invention is the provision of a hide stripping device which minimizes or eliminates the need for the operator to place his hands on the carcass of the animal.

A further object of the present invention is the provision of a hide stripping device which places the operator in the desirable position with reference to the carcass during the stripping operation.

A further object of the present invention is the provision of a hide stripping device which winds the hide around a drum while at the same time removing the hide from the carcass.

A further object of the present invention is the provision of a hide stripping device which includes appropriate controls for controlling both the downward movement of the drum and the rotational movement of the drum.

A further object of the present invention is the provision of a device which has improved sanitation during the hide stripping operation.

A further object of the present invention is the provision of a device which is economical to manufacture, durable in use and efficient in operation.

SUMMARY OF THE INVENTION

The present invention utilizes a vertical frame having a sliding frame mounted thereon for vertical sliding movement from an upper or elevated position to a lowered position. On the sliding frame is a rotatable drum having a chain attached thereto. The chain has a free end which is adapted to be attached to the hide of a carcass which is suspended adjacent the drum. A hydraulic ram is attached to the vertical frame and to the sliding frame for causing the sliding frame to move upwardly and downwardly between its elevated and lower positions.

The device is operated by attaching the chain to the hide of the carcass adjacent the tail thereof. The operator stands on a support stand which is located on the sliding frame, and operates two controls for controlling the downward movement of the hydraulic ram and for controlling the rotation of the drum. The sliding frame is moved downwardly by the hydraulic frame so as to cause the hide to be pulled downwardly and peeled away from the carcass of the animal. Simultaneously, the operator rotates the drum so as to cause the hide to be wound around the drum continuously as the sliding frame progresses downwardly.

After the hide has been removed from the carcass, it is wound around the drum. It can then be removed by rotating the drum in an opposite direction.

BRIEF DESCRIPTION OF THE FIGURES OF THE DRAWINGS

FIG. 1 is a perspective view of the hide stripping device of the present invention.

FIG. 2 is a sectional view taken along line 2—2 of FIG. 1.

FIGS. 4 and 5 are vertical sections taken through the device of FIG. 1, illustrating the use of the device for removing the hide from a carcass.

FIG. 6 is a schematic diagram of the hydraulic circuitry for the device.

DETAILED DESCRIPTION OF THE PREFERRED EMBODIMENT

Figure 3:
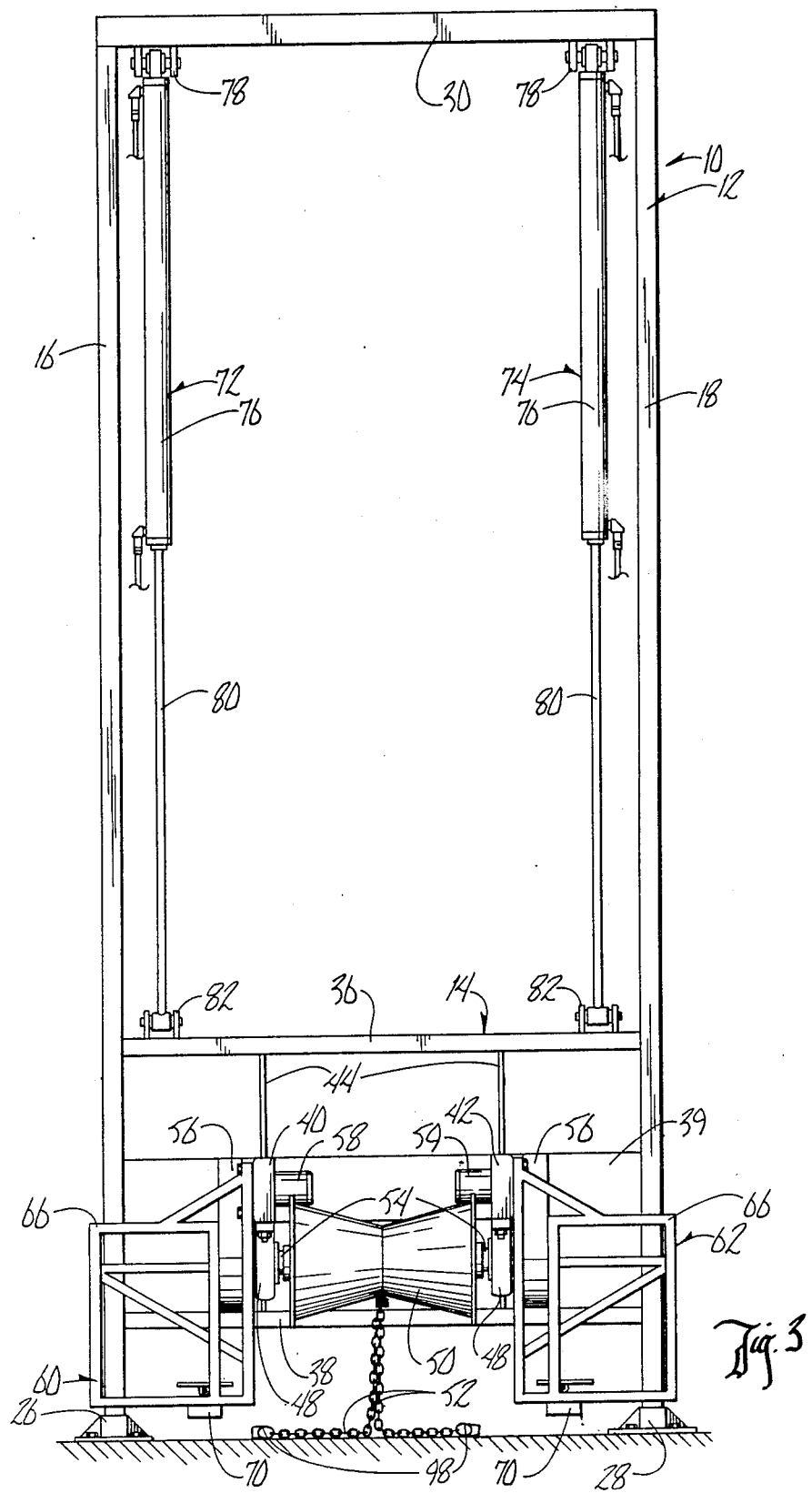
FIG. 3 is a front elevational view of the device shown in FIG. 1.

Referring to the drawings, the numeral 10 generally designates the hide stripping device of the present invention. Device 10 comprises a vertical support frame 12, and a sliding frame 14. Support frame 12 includes a pair of upstanding frame members 16, 18 which are parallel to one another and which are C-shaped in cross-section, as can be seen in FIG. 2. Each frame member 16, 18 in cross-section includes a web 20 and two side flanges 22, 24 which make up the cross-sectional C-shaped configuration. The lower ends of frame members 16, 18 include pedestals 26, 28 which may be anchored to a supporting surface.

The upper ends of frame members 16, 18 are joined by a cross-frame member 30.

Sliding frame 14 comprises a pair of spaced apart side frame members 32, 34 (FIG. 2) which are C-shaped in configuration and are matingly nested within the C-shaped configurations of frames 16, 18 of vertical support frame 12. Frame members 32, 34 are adapted to slide vertically up and down within the C-shaped members 16, 18. Sliding frame 14 also includes an upper cross-frame member 36 and a lower cross-frame member 38 which extend between and are connected to side frame members 32, 34. A central cross member 39 also extends between side frame members 32, 34. Welded to or otherwise secured to central cross member 39 are a pair of stub frames 40, 42 which are also supported by upper struts 44 extending downwardly from upper frame member 36 and lower struts 46 extending upwardly from lower frame member 38. Extending downwardly from stub frames 40, 42 are a pair of spaced apart axle bearing assemblies 48 (FIGS. 4 and 5). Rotatably journaled within bearing assemblies 48 is a rotatable drum 50 having a pair of chains 52 attached thereto. On the opposite ends of the axle 54 of drum 50 are a pair of sprockets (not shown) which are enclosed within a pair of sprocket and chain guards 56. A pair of hydraulic motors 58, 59 are attached to stub frame members 40, 42 and are drivingly connected to a chain and sprocket assembly 61 shown schematically in FIG. 6 and contained within chain and sprocket guards 56. Thus, actuation of either hydraulic motor 58 or hydraulic motor 59 will cause rotation of drum 50. Either hydraulic motor 58 or hydraulic motor 59 is capable of driving drum 50 by itself, but the use of two hydraulic motors provides an auxiliary system in the event that one motor breaks down.

Also mounted to slide frame 14 are a pair of operator stands 60, 62, each of which include a support platform 64 and a guard rail 66 for supporting a person to operate the device. The platform 60, the drum 50, and the slide frame 14 all move in unison upwardly and downwardly within the guide rails provided by side frame members 16, 18 of support frame 12. As can be seen in FIG. 2, a pair of foot pedal controls 68, 70 are mounted on the support frames 64 for permitting the operator to control the device in a manner to be described more fully hereafter.

A pair of hydraulic rams 72, 74 each include a cylinder 76 attached to cross frame 30 of support frame 12 by a clevis 78. Hydraulic rams 72, 74 also each include a piston rod 80 which is telescopically received within cylinder 76 and which is attached to cross-frame member 36 of sliding frame 14 by means of a clevis 82. Extension of rods 80 from rams 72, 74 causes sliding frame 14 to move to its lower position shown in FIG. 3 and FIG. 5. Retraction of rods 80 causes the sliding frame to be moved to its elevated position shown in FIG. 4.

FIG. 6 illustrates schematically the hydraulic connections of the various components. A hydraulic reservoir 84 and a pump 86 drive both the motors 58, 59 for drum 50 and the rams 72, 74. Foot pedal 68 operates a valve which has three positions. The first position causes drum 50 to be rotated in a first direction and the central or neutral position causes the drum 50 to be stationary. The third position reverses the rotational direction of the drum 50. A pair of selection valves 88, 90 are provided between valve 68 and drums 58, 59, respectively, for selectively making valves 58, 59 operable or inoperable. Thus, it is possible to turn motor 58 off by closing valve 88 and to turn motor 59 on by opening valve 90. In the event of a failure of motor 59, valve 90 can be closed and valve 88 can be opened to render motor 58 operable.

The foot pedal valve 70 also has three positions, a first position for raising the slide 54, a central position for holding the slide 54 stationary, and a third position for lowering the slide 54. Because pedals 68, 70 are contained on support frame 64, it is possible for the operator to stand on the support platforms and fully control the operation of rams 72, 74 and drum 50.

In order to use device 10 for removing the hide 92 from a carcass 94 suspended from a hook 96, it is first necessary to connect the ends 98 of chains 52 to the hide 90. This connection is shown in FIG. 4 with the slide frame 14 in its elevated position and with the operator standing on support platform 64. The operator then manipulates the foot pedals 68, 70 so as to cause the rams 72, 74 to force slide frame 14 downwardly, thereby causing the hide 92 to be peeled downwardly from the carcass 94. At the same time, the operator manipulates foot pedals 68, 70 to simultaneously cause the drum 50 to be rotated, thereby winding the chains 52 around the drum 50 and ultimately winding the hide 92 around the drum 50 as shown in FIG. 5. The hide 92 is completely removed from the carcass 94 and wound completely around drum 50 when the slide frame 14 reaches its lowermost position as shown in FIG. 5. Throughout this operation, the operator stands on support platform 64 and is carried downwardly with the sliding frame as it moves downwardly. This places the operator in a convenient position for using knives or other tools to aid in the removal of the hide 92. However, it is not necessary for the operator to place his hands on the carcass 94 or the hide 92 during the removal operation.

Once the hide is removed, the drum 50 is reversed so as to unwind the hide for removal. The operator then elevates the slide frame 14 to the elevated position shown in FIG. 4 for removal of another hide.

Thus, it can be seen that the device accomplishes at least all of its stated objectives.

What is claimed is:

1. A hide stripping device for stripping the hide from a carcass suspended by its hind legs, said device comprising:

an elongated vertical support frame, said support frame having vertical guide track means thereon;

a sliding frame movable mounted to said guide track means for vertical reciprocating movement thereon between an elevated position and a lower position, an operator support stand attached to said sliding frame and movable in unison with said sliding frame between said elevated and lower positions, said support stand being of a size capable of supporting a person;

a rotatable drum means having opposite axial ends and being mounted on said sliding frame for movement with said sliding frame between said elevated and lower positions, said drum means being rotatable about a horizontal axis and having an outer drum surface which tapers radially inwardly from said opposite axial ends toward a reduced diameter portion located approximately midway between said opposite axial ends of said drum means;

drum power means on said sliding frame and connected to said drum means for causing said drum means to rotate about said horizontal axis;

a hydraulic ram comprising a cylinder and rod, one of said cylinder and rod being connected to said support frame and the other of said cylinder and rod being connected to said sliding frame for causing said sliding frame to move between said elevated and said lowered positions;

a pair of elongated flexible members each having a first end attached to said reduced diameter portion of said drum means and each having a second end attachable to said hide of said carcass;

first and second separate control means on said sliding frame, said first control means being connected to said drum power measn for actuating and deactuating said drum power means, said second control means being connected to said hydraulic ram means for actuating and deactuating said hydraulic ram means.

2. A device according to claim 1 wherein said vertical support frame defines a vertical plane, said sliding frame having a portion extending horizontally away from said plane, said drum means being horizontally spaced from said plane.

3. A device according to claim 1 wherein said guide track means comprises a pair of spaced apart parallel vertical guide members, each of said guide members being C-shaped in cross-section, said sliding frame comprising a spaced apart pair of side frame members matingly fitted within said C-shaped cross-sectional configuration of said guide members and being vertically slidable therein.

4. A device according to claim 1 wherein said operator support stand comprises a platform for receiving and supporting the feet of said person, said first and second control means comprising first and second foot-operated controls positioned adjacent said platform so as to be adjacent the feet of said person when said person is standing on said platform.

5. A method for stripping the hide from a carcass suspended by its hind legs, said carcass having a tail end and a head end, said tail end being positioned above said head end, said method comprising:

elevating a sliding frame to an elevated position, said sliding frame having rotatable drum means and a platform for supporting a person thereon, said drum means being adjacent said tail end of said carcass when said sliding frame is in its elevated position, said sliding frame being movable mounted to a vertical support frame from said elevated position downwardly to a lower position, said drum means having opposite axial ends and an outer surface which tapers radially inwardly from said opposite axial ends toward a reduced diameter portion located intermediate said opposite axial ends;

connecting one end of the ends of at least two elongated flexible members to said rotatable drum means at said reduced diameter portion and the other ends of said flexible members to said hide adjacent said tail end of said carcass;

forcing said sliding frame downwardly towards said lower position with hydraulic extensible power means whereby said flexible member will be placed in tension and will pull said hide downwardly to remove said hide from said carcass;

simultaneously rotating said drum means to cause said flexible members to pull said hide toward said reduced diameter portion of said drum means and to wind said hide around said drum means during downward movement of said sliding frame;

controlling the rate of downward movement of said sliding frame and the rate of rotation of said drum with first and second foot operated control means located on said platform of said sliding frame.

* * * * *